United States Patent [19]

Chatterjee

[11] Patent Number: 4,458,064

[45] Date of Patent: Jul. 3, 1984

[54] PROCESS AND APPARATUS FOR CONTINUAL MELT HYDROLYSIS OF ACETAL COPOLYMERS

[75] Inventor: Ananda M. Chatterjee, Houston, Tex.

[73] Assignee: Celanese Corporation, New York, N.Y.

[21] Appl. No.: 505,595

[22] Filed: Aug. 19, 1983

Related U.S. Application Data

[63] Continuation of Ser. No. 350,502, Feb. 19, 1982, abandoned.

[51] Int. Cl.$^3$ ................................................ C08G 2/28
[52] U.S. Cl. .................................... 528/501; 528/230; 528/270; 528/480; 528/481; 528/499
[58] Field of Search ............... 528/230, 270, 480, 481, 528/499, 501

[56] References Cited

U.S. PATENT DOCUMENTS

| | | | |
|---|---|---|---|
| 3,318,848 | 5/1967 | Clarke | 528/270 |
| 3,839,267 | 10/1974 | Golder | 528/230 |
| 3,853,806 | 12/1974 | Golder | 528/230 |
| 4,225,703 | 9/1980 | Amann et al. | 528/230 |

Primary Examiner—Lucille M. Phynes
Attorney, Agent, or Firm—Herbert P. Price; Andrew F. Sayko

[57] ABSTRACT

The present invention is an improved method for stabilizing acetal copolymers by hydrolyzing the copolymer product in a low energy reaction process wherein undesirable side products are continuously and efficiently removed by melting and extruding the unhydrolyzed oxymethylene copolymer into a hydrolysis reaction zone in which the necessary reactants are intimately contacted with the copolymer, preferably by means of flow division and rearrangement mixing technique. Subsequently, the hydrolyzed copolymer product is devolatilized to remove the unwanted side products by passing it through a devolatilization zone preferably having more than one devolatilization port and a vacuum source from which negative pressure is available for application to the devolatilization ports so that the undesired products may be effectively removed.

11 Claims, 14 Drawing Figures

PROCESS AND APPARATUS FOR CONTINUAL MELT HYDROLYSIS OF ACETAL COPOLYMERS

This is a continuation of application Ser. No. 350,502, filed Feb. 19, 1982, now abandoned.

BACKGROUND OF THE INVENTION

The present invention relates to an improved process for producing acetal copolymers and, in particular, to such a process which enhances the thermal stability of acetal copolymer resins.

Acetal copolymer resins are characterized by a predominately carbon-oxygen oxymethylene backbone occasionally interrupted by a comonomer unit having a carbon-carbon linkage. The simple linear chain structure and the relative shortness of the carbon-oxygen bond impart properties of high crystallinity and relatively high density to acetal resins in the solid state. Commercial products of acetal resins have high stiffness, good dimensional stability, high tensile and impact strength, good abrasion resistance, and a low coefficient of friction, all of which make acetal resins excellently suited for, among other things, replacement of metals and provision of fatigue-resistant rigid articles and/or parts. Typically, such items are manufactured as shaped articles by injection molding or extrusion processes.

The copolymers forming acetal resins, however, contain monomeric units which have comparatively unequal stability to degradation. Furthermore, resistance of the copolymer to degradation depends, in many cases, as much upon the relative position of the monomeric units within the polymeric chain as it does upon the inherent monomeric structure. For example, if a copolymer is susceptible to degradation by a mechanism which attacks the ends of the polymeric chain, it can be seen that if the ends of the molecules are susceptible to degradation, the copolymer will have less stability than one in which the molecule ends are relatively stable.

Acetal copolymers, which, as has been known for years, may be prepared, for instance, by the polymerization of trioxane—a cyclic trimer of formaldehyde—and ethylene oxide, have recurring oxymethylene groups, $-OCH_2-$, directly attached to each other as well as oxyethylene groups, $-OCH_2CH_2O-$, interspersed throughout the polymeric chain. Oxymethylene copolymers of this type are described in commonly assigned U.S. Pat. No. 3,027,352 to Walling et al., the pertinent parts of which are incorporated herein by reference. Such copolymers contain polymeric chains having 60 to 99.6 percent oxymethylene units some of which form the end groups of such chains. These copolymers are subject to physical degradation under high temperature conditions due to the decomposition of formaldehyde units having a terminal hydroxyl group, i.e.$-(CH_2O)_nH$. Accordingly, even though acetal resins possess many excellent physical properties, they are subject to a certain degree of degradation, particularly under the influence of heat, unless they have been subjected to treatment which effectively eliminates the relatively unstable characteristics inherent therein.

It has been discovered that thermal degradation of acetal resins resulting from the splitting off of successive formaldehyde units, commonly referred to as a "zipper" reaction, is halted when the reaction reaches a comonomer on the polymeric chain having a comparatively stable structure, such as the carbon-to-carbon bond present in oxyethylene. To that end, efforts over the years to improve the thermal stability of acetal copolymers have been directed toward eliminating the terminal polyoxymethylene groups as completely as possible. The primary method developed for removing the oxymethylene end groups is by hydrolysis, which has the effect of shifting the hydrogen atom of the terminal hydroxyl group to the oxygen atom of the next adjacent oxymethylene group, while simultaneously detaching the endmost oxymethylene group from the polymeric chain.

Exploration into the chemistry and technology necessary to sustain efficient production level hydrolysis of polyoxymethylene copolymers has led to several further developments in the art of commercial acetal resin production. For example, U.S. Pat. No. 3,174,948 to Westfield et al., which is assigned to the same assignee as the present application, describes an aqueous alkanol solvent (for copolymers) which allows for complete solution of the copolymer at lower temperatures than either water or the alkanol alone. In commonly assigned U.S. Pat. No. 3,219,623 to Berardinelli a process for stabilizing normally solid oxymethylene copolymers is described which includes a hydrolysis reaction of the copolymer under non-acidic, and preferably alkaline, conditions with a hydroxy-containing material such as water or alcohol.

U.S. Pat. No. 3,301,821 to Asmus et al. discloses a process for thermostabilizing copolymers having terminal oxymethylene groups by splitting off the terminal oxymethylene groups when the copolymer is treated at a temperature of 100° C. to 160° C. at autogenous pressure with a saturated vapor mixture of water, a volatile organic swelling agent, and a volatile base for catalyzing the removal of oxymethylene groups. The copolymer is suspended in a wire mesh basket within an autoclave wherein the reactive vapor atmosphere is generated. In order to prevent discoloration which may occur, it is suitable to add urea to the liquid phase in an amount of 0.5 to 5% based on the weight of the liquid phase.

Celanese-assigned U.S. Pat. No. 3,318,848 to Clarke describes a melt hydrolysis process which involves a mixture of the copolymer and a reactant selected from the group consisting of water, alcohols, and mixtures thereof. The polymer melt is hydrolyzed in a single reaction zone at a temperature of from 160° C. to 240° C. and a pressure in the range of from 150 to 10,000 psia. U.S. Pat. No. 3,418,280 to Orgen, which is also assigned to Celanese, shows an improvement in the melt hydrolysis processes described in the Clarke patent which improvement includes reacting the polymer with the reactants at a pH between 9.5 and 11.0.

In both processes the polymer-reactant system is a single phase system reacted in a reaction zone which is usually a single screw extruder. Such a reactor has a very limited degree of mixing and can handle only a low level of hydrolysis solvent. Furthermore, the devolatization capacity is very limited.

A further method of hydrolysis described in U.S. Pat. No. 3,419,529 to Chase et al.; U.S. Pat. No. 3,428,605 to Smith et al.; and U.S. Pat. No. 3,505,292 to Smith et al., all of which are assigned to the same assignee as the present application, is accomplished by forming a slurry of solid polymer particles in a liquid hydrolysis reaction medium while the slurry is transported to a further stage of polymer treatment without substantial backmixing. The hydrolysis medium which is ideally composed of water, a water-soluble non-acidic organic compound having an oxygen atom directly bonded to a carbon atom, and, in accordance with U.S. Pat. No. 3,428,605 to Smith et al., between 50 and 99 weight percent of trioxane, is maintained at a temperature causing the polymer to swell, but not to dissolve, become tacky or agglomerate in the hydrolysis medium. A suitable type of equipment used to continuously convey the slurry while carrying out the chemical hydrolysis reaction in this process is a non-backmixing screw conveyor.

More recently, Celanese-assigned U.S. Pat. Nos. 3,839,267 and 3,853,806 to Golder describe a heterogenous melt hydrolysis process for stabilizing copolymers containing oxymethylene end groups in which the polymer is reacted while in the molten state whereas the reactant mixture is in the gaseous or vapor state—thus giving rise to the term heterogeneous. As in the previous hydrolysis process, the hydrolysis reaction is usually intended to be carried out in a single screw extruder.

While the hydrolysis of acetal copolymers increases the thermal stability of said copolymers, a side product of the principal reaction, formaldehyde, simultaneously becomes immediately available as a reactant for several other reactions within the reaction zone which adversely effect the end product. For example, traces of oxygen can oxidize formaldehyde, especially at elevated temperatures, to acidic species like formic acid, performic acid, etc.

Furthermore, the base-generating catalyst triethylamine, TEA, which is commonly used in hydrolysis reactions, can react (1) with formic acid to form triethylammonium formate:

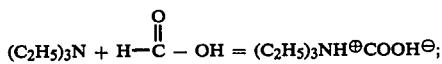

and (2) with traces of HF (which may be present as a result of using $BF_3$ as a polymerization catalyst) to form triethylammonium fluoride:

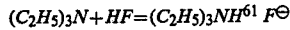

Both triethylammonium formate and triethylammonium fluoride have been demonstrated to induce degradation of acetal copolymers.

Formaldehyde may also undergo another reaction under alkaline conditions, namely aldol-type condensation to form formose sugars according to the equation below:

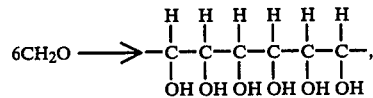

which eventually lead to undesirable formation of color in the acetal copolymer product.

Thus, in addition to the desired hydrolysis reaction, a number of undesirable side reactions can simultaneously occur inside the reactor, which, because of the very nature of such reactions, can adversely affect the final properties of the copolymers. It is clear, therefore, that an efficient removal of formaldehyde TEA and other undesirable species (e.g., formic acid, HF, etc.) which might be present during hydrolysis should improve both the thermal stability and other qualities of the copolymer. In the case of solution type hydrolysis, many of the harmful products may be disposed of by a washing treatment, but since melt-hydrolyzed copolymer does not undergo a thorough washing treatment, some of the harmful products are retained in melt-hydrolysis copolymer thereby causing an inferior quality product. This is an unfortunate problem in the area of commerical acetal resin production because the melt hydrolysis method of producing oxymethylene copolymers consumes as much as one third less energy than the solution type hydrolysis.

It is therefore an object of the present invention to overcome the problems, such as those itemized above, associated with undesirable side products and side reactions resultant therefrom during melt-hydrolysis of acetal copolymers.

Furthermore, the limitations of the Clarke process and apparatus as set forth above are obviated thereby allowing a more efficent hydrolysis process, which, in turn, reduces the residence time of the copolymer in the hydrolysis reactor. This adds to the quality of the resultant polymer, by, for one thing, reducing undesirable coloration of the resin product.

SUMMARY OF THE INVENTION

By the present invention there is provided an improved method for stabilizing acetal copolymers by hydrolyzing the copolymer product in a low energy reaction process wherein undesirable side products are continuously and efficiently removed without the need for thorough washing and/or an additional energy-consuming step. Specifically, the unhydrolyzed oxymethylene copolymer product is melted and extruded into a hydrolysis reaction zone wherein the necessary reactants are intimately contacted with the copolymer, preferably by means of a flow division and rearrangement mixing technique, after which the hydrolyzed copolymer product is devolatized to remove the unwanted side products by passing it through a devolatilization zone preferably having more than one devolatilization port and a vacuum source from which negative pressure is available for application to the devolatilization ports so that the undesired products may be effectively removed.

As a result of this invention, acetal copolymers may be produced by means of the more energy efficient melt hydrolysis process which have enhanced thermal stability, but which do not have concomitant physical defects such as discoloration.

For a better understanding of the present invention, together with other and further objects, reference is made to the following description, taken in conjunction with the accompanying drawing and examples, and its scope will be pointed out in the appended claims.

DETAILED DESCRIPTION OF THE INVENTION

Figure 1:
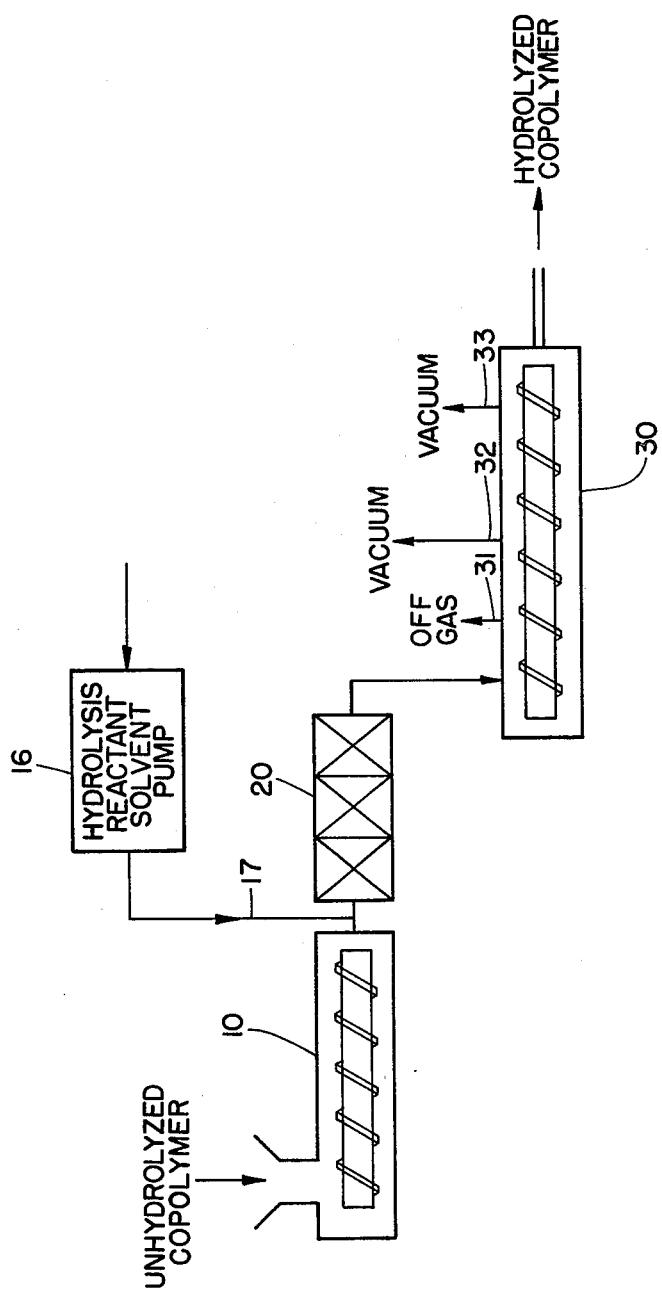
FIG. 1 is a schematic of an apparatus designed to implement the process of the present invention.

Acetal copolymers of the present invention are preferably prepared by the copolymerization of trioxane, a cyclic trimer of formaldehyde, with a cyclic ether having the structure

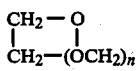

where n is an integer from zero to 2. Among the specific cyclic ethers which may be used are ethylene oxide; 1,2-dioxolane; 1,3,5-trioxepane; 1,3-dioxane; trimethylene oxide; pentamethylene oxide; 1,2-propylene oxide; 1,2-butylene oxide; neopentyl formal; pentaerythritol diformal; paraldehyde; tetrahydrofuran and butadiene monoxide.

As used in the specification and claims of the subject application, the term "oxymethylene" includes substituted oxymethylene, where the substituents are inert with respect to the reactions in question, that is, the substituents are free of interfering functional groups and will not introduce undesirable reactions. As used in the specification and claims of this application, the term "copolymer" means polymers having two or more monomeric groups, including terpolymers and higher polymers. Suitable terpolymers include those disclosed in U.S. Pat. No. 3,686,142 to W. E. Heinz and F. B. McAndrew, which is assigned to the same assignee as the subject application.

The preferred polymers which are treated in this invention are thermoplastic materials having a melting point of at least 150° C. and are normally millable at a temperature of 200° C. They have a number average molecular weight of at least 10,000. These polymers have a high thermal stability before treatment in accordance with this invention but this stability is markedly improved by such treatment.

The preferred polymers which are treated in this invention, have an inherent viscosity of at least one (measured at 60° C. in an 0.1 weight percent solution in p-chlorophenol containing 2 weight percent of α-pinene). After treatment, the preferred copolymers exhibit remarkable alkaline stability.

The preferred catalysts used in the preparation of the desired copolymers are boron fluoride and boron fluoride coordinate complexes with organic compounds, particularly those in which oxygen or sulfur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is a preferred coordinate complex. The boron fluoride complex with diethyl ether is also very effective. Other boron fluoride complexes which may be used are the complexes with methyl acetate, with ethyl acetate, with phenyl acetate, with dimethyl ether, with methyl phenyl ether and with dimethyl sulfide. Suitable catalysts are disclosed in U.S. Pat. Nos. 2,989,505, 2,989,506, 2,989,507, 2,989,509, all of which are By Donald E. Hudgin and Frank M. Berardinelli; U.S. Pat. No. 2,989,510, by George J. Bruni; and U.S. Pat. No. 2,989,511 by Arthur W. Schnizer. All the above patents are assigned to the same assignee as the subject application.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the polymerization zone are preferably anhydrous or substantially anhydrous. Small amounts of moisture, such as may be present in commercial grade reactants or may be introduced by contact with atmospheric air, will not prevent polymerization, but should be removed for best yields.

In preparing the preferred copolymers, the trioxane, cyclic ether and catalyst are disolved in a common anhydrous solvent such as cyclohexane, and permitted to react in a sealed reaction zone. The temperature in the reaction zone may vary from about 0° C. to about 120° C. The period of reaction may vary from about 5 minutes to about 72 hours. Pressures from subatmospheric to about 100 atmospheres, or more, may be used, although atmospheric pressure is preferred.

The chemical constitution of the cyclic ether must be considered. Thus, 1,3-dioxolane contains both an oxymethylene group and oxyethylen group. Its incorporation into the copolymer molecule increases both the oxymethylene and the oxyethylene content of the polymer molecule.

In general, the cyclic ether is present in the reaction mixture in amounts between about 0.2 and about 30 mol percent, based on the total mols of monomer. The optimum proportion will depend on the particular copolymer desired, the expected degree of conversion and the chemical constitution of the cyclic ether used.

The copolymers produced from the preferred cyclic ethers have a structure substantially composed of oxymethylene and oxyethylene groups in a ratio from about 250:1 to about 1.3:1.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine or triethylamine, in stoichiometric excess over the amount of free catalyst in the reaction product, and preferably in an organic wash liquid which is a solvent for unreacted trioxane. Or, if desired, the reaction product may be washed with water which neutralizes catalyst activity. A detailed description of suitable methods of neutralizing catalyst activity may be found in U.S. Pat. No. 2,989,509 by Donald E. Hudgin and Frank M. Beradinelli, assigned to the same assignee as the subject application.

In accordance with the subject invention the comparatively stable monomeric portions or units of the polymer may be removed by a process which comprises treating the polymer with a reactant under conditions such that the polymer-reactant system is in liquid form and continuing the reaction at an elevated temperature and pressure and for a period of time sufficient to remove the comparatively stable portions or units from the ends of the polymer molecules so that the molecules are terminated by comparatively stable units.

The polymer-reactant system may achieve liquid form by a number of methods, such as (1) melting the polymer and adding the reactant thereto under such conditions that the polymer reactant system remains liquid or (2) mixing the polymer and the reactant and then heating until the polymer-reactant system is in liquid form.

When the copolymer is a heterogeneous copolymer with the comparatively unstable units being oxymethylene units, the preferred chemical treatment is an "hydrolysis" treatment under non-acidic, and preferably alkaline, conditions. In a preferred embodiment the polymer is reacted with from about 2 weight percent to about 40 weight percent of the preferred hydrolysis reactant. The reaction must take place an an elevated temperature and pressure such that the polymer-reactant system will remain in a liquid condition during the reaction. Thus the treatment may be referred to as a "molten hydrolysis" or "melt hydrolysis." The hydrolytic reactant may be water or an organic hydroxy-containing compound such as a primary, secondary or tertiary aliphatic or aromatic alcohol or mixtures thereof. Suitable alcohols include methyl alcohol, ethyl alcohol, n-propyl alcohol, isopropyl alcohol, secondary butyl alcohol, tertiary butyl alcohol, and other aliphatic alcohols; and benzyl alcohol, $\alpha$-phenylethyl alcohol, $\beta$-phenylethyl alcohol, ortho-methylbenzyl alcohol, diphenyl carbinol, triphenyl carbinol, and other aromatic alcohols. As used herein the term "hydrolysis" includes the reaction of the polymer with water or the aforementioned organic hydroxy-containing materials or mixtures thereof.

The molten polymer is subjected to the hydrolysis under alkaline conditions. The alkaline material is preferably water soluble, or soluble in the organic hydroxy-containing material, and may be a strongly basic hydroxide such as the hydroxide of an alkali metal or alkaline earth metal, or it may be the salt of a strong base and weak acid, or it may be ammonia or an organic base, such as an amine or an amidine.

An alkaline material should be present in the chemical reaction in an amount of from 0.001 weight percent to about 0.01 weight percent, most preferably between about 0.001 weight percent and about 1.0 weight percent. When no alkaline material is used it may be desirable to have the reaction take place in a buffered system since the products of the hydrolysis are acidic and would thereupon cause the system to become acidic which might have deleterious effects on the polymer.

In addition alkaline hydrolysis is preferable over neutral hydrolysis since it is faster and since the alkaline material will neutralize any excess polymerization catalyst which might otherwise tend to degrade the polymer during the hydrolysis step.

After the polymerization rection it may be desirable to subject the polymer to washing and drying in order to remove unreacted monomers, solvent and catalyst residues. However, in a preferred embodiment of this invention the copolymer is subjected to the melt hydrolysis treatment promptly after the completion of the polymerization reaction. In a particularly preferred embodiment of this invention, the active catalyst is neutralized by mixing the polymerization reactor product with a material which may also serve as the chemical reactant for the hydrolysis. Specifically water, or a mixture of an alcohol, such as methanol, and water, may be used in which small amounts of ammonia or an amine such as triethylamine may be present. The reactant may include unreacted materials from the polymerization reaction, such as trioxane. These materials do not ordinarily have an undesirable effect on the subsequent melt hydrolysis treatment, and may therefore be regarded as inert for this reaction.

In a preferred embodiment the reactant should be used in an amount between about 2 weight percent and about 40 weight percent of the polymer. The polymer reactant system is treated and maintained under conditions such that the polymer-reactant system remains in a liquid form. Thus satisfactory results may be obtained below the melting point of the polymer itself, as long as the polymer-reactant system is liquid. For example, a system containing 80 weight percent of a trioxane-2% ethylene oxide copolymer and 20 weight percent of a 60% water-40% methanol reactant has a solution point about 125° C. which is considerably below the melting point of the copolymer itself. However, temperatures somewhat above the melting point of the sytem are preferred because the hydrolysis reaction rate increases with increase in temperature. The polymer-reactant system is in a single phase. The melt hydrolysis reaction will normally not take place until sufficiently elevated temperatures and pressures are reached to place the polymer-reactant system in liquid form and the materials must be held at such temperature and pressure until the desired amount of unstable portions are removed from the ends of the polymer molecules.

On some occasion it may be desirable to mix the polymer with a larger amount of reactant and after the catalyst has been neutralized remove a portion of the reactant by filtering, vaporization, etc. in order to retain only between 2 and 40 weight percent of reactant present with the polymer during the melt hydrolysis reaction.

Furthermore, it may be desirable to neutralize the catalyst and then filter, wash and dry the polymer, whereupon the polymer may then be conveniently kept until is is subjected to the melt hydrolysis treatment at a later time.

It may also be desirable to incorporate one or more chemical stabilizers into the copolymer in order to bring its thermal degradation rate evn lower. The proportion of stabilizer incorporated depends upon the specific stabilizer used. A proportion between about 0.005 and 10 weight percent (based on the weight of polymer) has been found to be suitable for most stabilizers.

One suitable stabilizer system is a combination of (1) an anti-oxidant ingredient, such as phenolic anti-oxidant, and most suitably a substituted bisphenol, and (2) an ingredient to inhibit chain scission, generally a compound of a polymer containing trivalent nitrogen atoms.

A suitable class of substituted bisphenols are the alkylene bisphenols including compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2-methylene bis(4-methyl-6-tertiary butyl phenol) and 4,4'-butylidene bis (6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having tertiary amine and terminal amide groups, compounds having amidine groups, cycloaliphatic amine compounds and aliphatic acylureas. The stabilizers may be present in the melt hydrolysis step or they may be added to the hydrolyzed polymer after the melt hydrolysis step.

Figure 7:
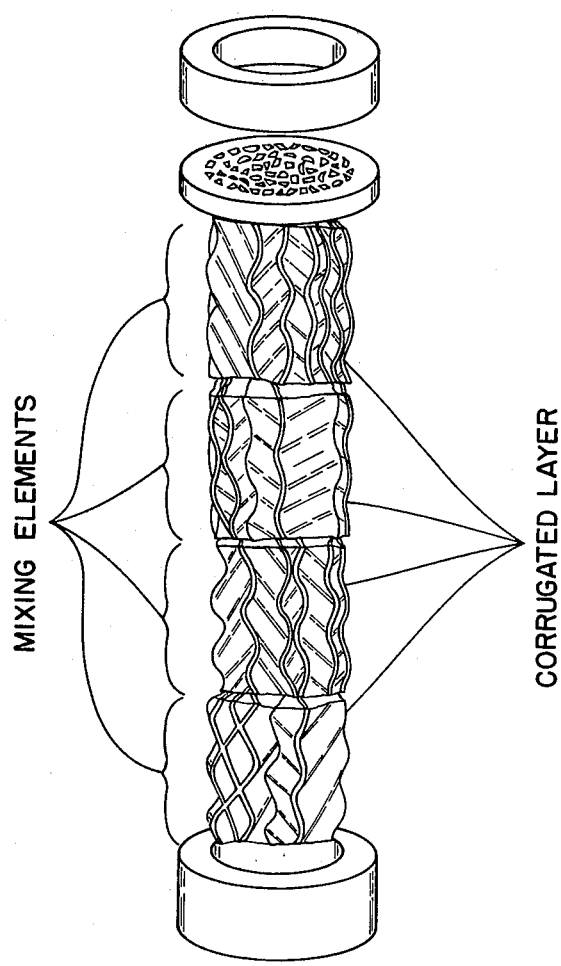
FIG. 7 is a schematic of a static mixer which may be used in a preferred embodiment of the present invention.

In any event, the hydrolysis reactor of the present invention preferably utilizes the principle of flow division and rearrangement of the melted copolymer/reactant system in order to insure intimate contact between the copolymer and the hydrolysis reactants. Such mixing is effected by static mixer elements arranged in series. One such mixing apparatus is a Koch mixer which includes separate elements (shown herein at FIG. 7), each element of which contains several essentially planar corrugated layers which intersect to form a multitude of mixing cells within the element. The stream of copolymer/reactant mixture entering a mixing element is rearranged due to extensional and shearing forces, i.e., the linear pressure exerted on the mixture stream by the melt extruder forces the stream to be separated by the element layers, thereby dividing the throughput into new streams, each of which leaves the respective cell in a different direction. Each new stream upon arriving at the next element is rearranged and again divided to form subsequent new streams, each of which departs in a new direction for further rearranging and subdivision. While one example of a static mixer is shown herein the invention is not to be limited thereby since there are several types of static mixers available, such as the mixers produced by the Kenics Corporation, The Dow Chemical Company, Dow Badische Company, et al., which could be effectively utilized within the scope of the present invention. Even though this method of mixing in the hydrolysis reaction zone requires no additional energy, it nevertheless provides thorough contact between the copolymer and the reactant so that an efficient hydrolysis of the copolymer is effected.

After the melt hydrolysis reaction has been completed and a satisfactory amount of unstable monomeric units have been removed from the polymer molecules the present invention includes a stage wherein the copolymer/reactant mixture is introduced into a devolatilization zone wherein the remaining reactant is extracted from the polymer and the melt hydrolysis products, e.g., formaldehyde, HF, formic acid, etc., are removed. In a preferred embodiment of the invention, the devolatilization zone consists of a multivented single screw extruder to which a vacuum source is applied to provide negative pressure sufficient to remove volatile products which are not evicted from the reactor by means of autogenous over-pressure. A suitable arrangement for such a devolatilization zone consists of an extruder having three vent ports which allow post-hydrolysis devolatilization to proceed in stages. The first vent, situated immediately after the exit of the hydrolysis reactor, is essentially a pressure-release port to which no vacuum is applied since the volatile products resulting from melt-hydrolysis create an autogenous over-pressure sufficient to expel such products into the atmosphere. Subsequent vents, however, must be supplied with negative pressure in varying degrees to insure maximum removal of the aforementioned unwanted side products.

In FIG. 1 there is shown an apparatus suitably configured for carrying out the unique hydrolysis process of the present invention. The required process steps progress from the left hand side, where the unhydrolyzed copolymer is melted in a single-screw extruder 10, to the right hand side where stabilized copolymer exits the process. From the screw extruder 10, molten acetal copolymer is transported to hydrolysis reactor 20. Prior to introduction into the reactor, the molten copolymer is combined with a solvent containing hydrolysis reactant which is supplied to the process by means of reactant solvent pump 16 via solvent supply line 17. The reactor 20 is preferably constructed of a series of static mixer elements firmly housed in a corrosion-resistant jacket, such as a stainless steel cylinder.

The copolymer/reactant combination is thoroughly mixed by flow division and rearrangement thereby insuring complete hydrolysis of the copolymer without consuming additional energy to power a mixing mechanism. After the copolymer has undergone hydrolysis in the reactor 20, the resulting combination, which includes hydrolyzed copolymer, solvent, and hydrolyzation side products, is immediately subjected to devolatilization in a multi-vented screw extruder 30.

Since an autogenous pressure greater than atmospheric pressure is built up as a result of the formation of volatile side products, the initial vent port need not be provided with a vacuum in order to remove the off gas indicated by exhaust arrow 31. Due to the reduction in autogenous pressure caused by the escape of volatiles at the first vent port, subsequent vent ports should be provided with a vacuum, depicted herein by arrows 32 and 33, to facilitate efficient removal of remaining undesirable side products and/or additional products resulting from secondary reaction of said side products.

Acetal copolymers produced in accordance with the present invention have a high thermal stability and typically possess very acceptable color quality, both of which are demonstrated by the following examples.

EXAMPLES

Figure 2:
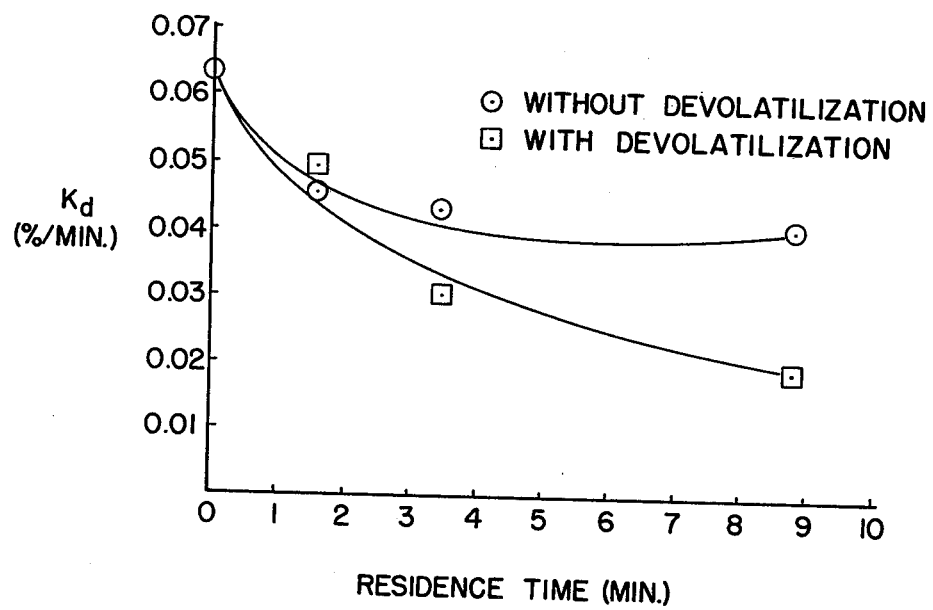
FIGS. 2 and 3 are graphs comparing the thermal stability of melt hydrolyzed acetal copolymers without devolatilization to melt hydrolyzed acetal copolymers with devolatilization.

Experiments were conducted to determine the effect of the melt hydrolysis process of the present invention on the thermal stability of acetal copolymers prepared according to the method set forth above. Specifically, trioxane-ethylene copolymer produced in a polymerization reactor was melt hydrolyzed with devolatilization and without devolatilization at different flow rates which consequently produced different residence times in the hydrolyzation zone. The devolatilization zone used in the experiments, the results of which are indicated at FIG. 2, was a single screw extruder having only a single vent port to which a vacuum was applied. Thermal stability, determined herein by the rate at which the copolymer loses weight at elevated temperature, is designated as $K_D$ (which was determined at a temperature of 230° C.) and is plotted in FIG. 2 against the different residence times to compare the thermal stability of melt hydrolyzed acetal copolymer without devolatilization to the thermal stability of melt hydrolyzed acetal copolymer which had been devolatilized. Prior to testing the thermal stabilities, a stabilizer system such as those described hereinabove was incorporated into the hydrolyzed copolymer. The base for hydrolysis used in these runs was 1% triethylamine in water solution which was metered into the process at a rate which fixed the ratio of the base to the copolymer at 10% by weight. FIG. 2 clearly shows that devolatilization aids in lowering the $K_D$, thus indicating a higher thermal stability.

Figure 3:
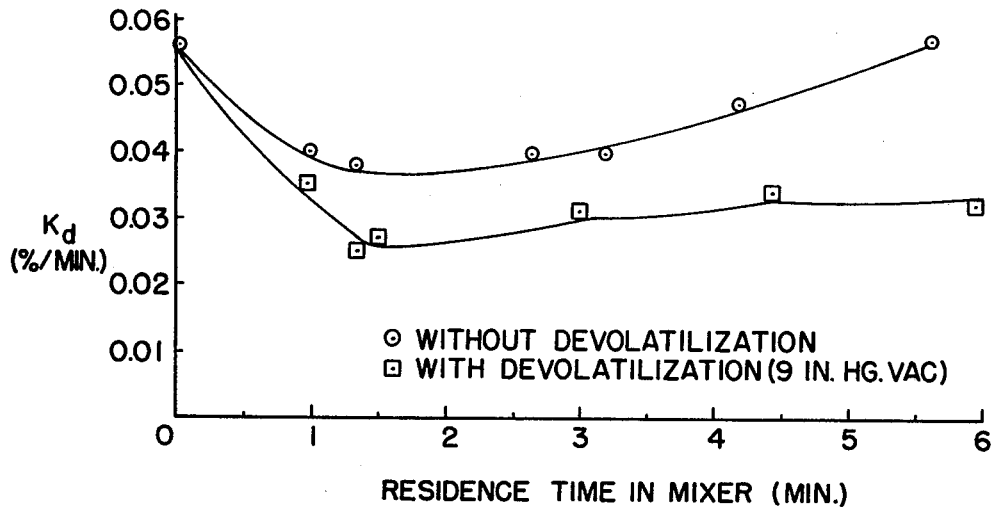

Results of further experiments testing the effect of devolatilization on thermal stability are depicted in FIG. 3. Unlike the previously-reported experiments, a vacuum-supplied single vented screw extruder was used as the devolatilization zone in these experiments. The stabilizer system was combined with the copolymer before testing the thermal stability. Again, the results clearly indicate that an acetal copolymer which is subjected to devolatilization immediately after the hydrolysis zone exhibit a higher thermal stability, i.e., lower $K_D$, than melt hydrolyzed acetal copolymer not similarly subjected to a vacuum.

Figure 4:
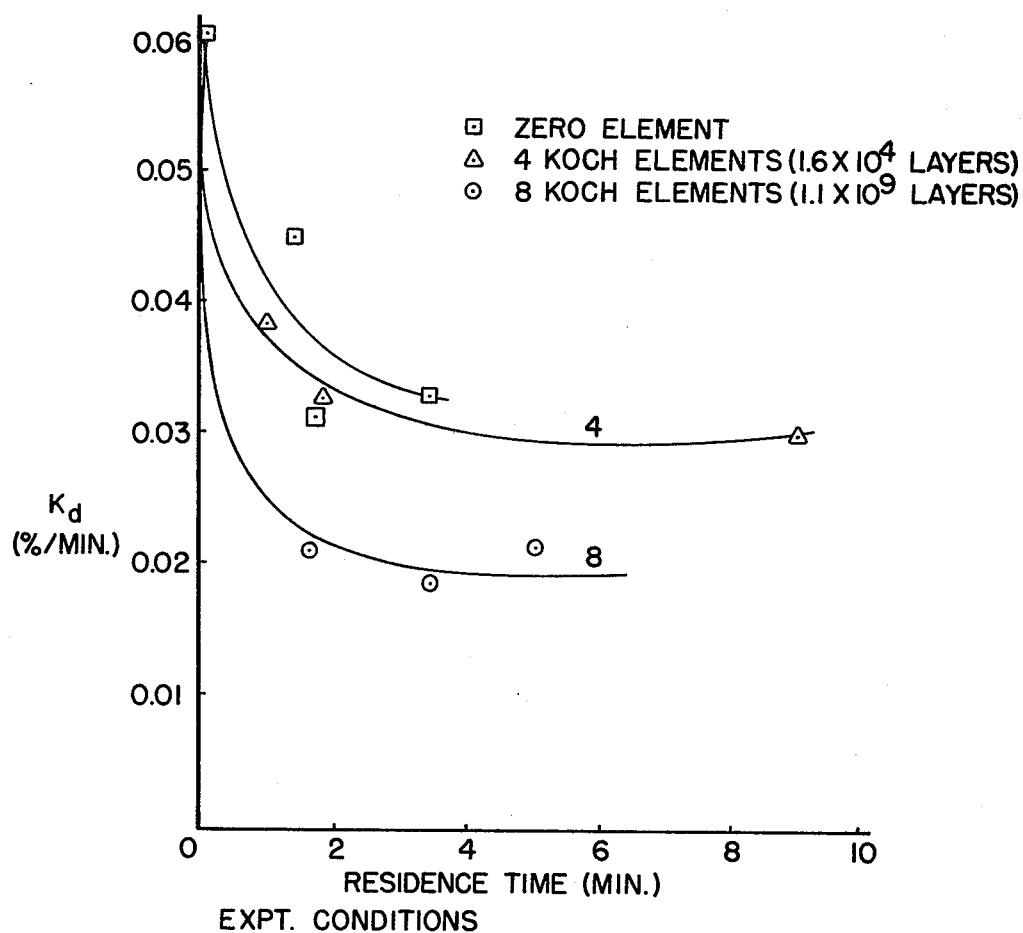
FIGS. 4 and 5 are graphic depictions of test results run to show the effect of the degree of mixing on the thermal stability of acetal copolymers prepared according to the present invention.
Figure 5:
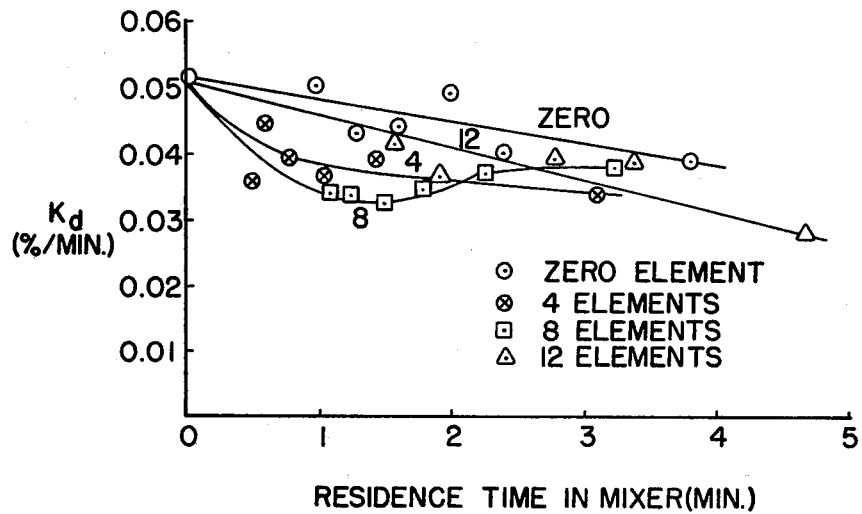

A preferred embodiment of the present invention involves the degree of mixing to which acetal copolymer is subjected during the hydrolysis reaction itself, i.e. while the melted acetal copolymer/base is in the hydrolysis zone. Accordingly, experiments were conducted to examine the effect of the degree of mixing on the thermal stability of acetal copolymer, the results of which are graphed on FIGS. 4 and 5. The mixing portion of the hydrolyzation zone comprised Koch mixing elements secured within a stainless steel jacket. From FIGS. 4 and 5, it can be seen that, ideally, the number of mixing elements which should be used for a residence time of up to 2 minutes is between 4 and 12, and preferably about 8 elements, to maximize the thermal stability of the resultant copolymer.

Figure 6:
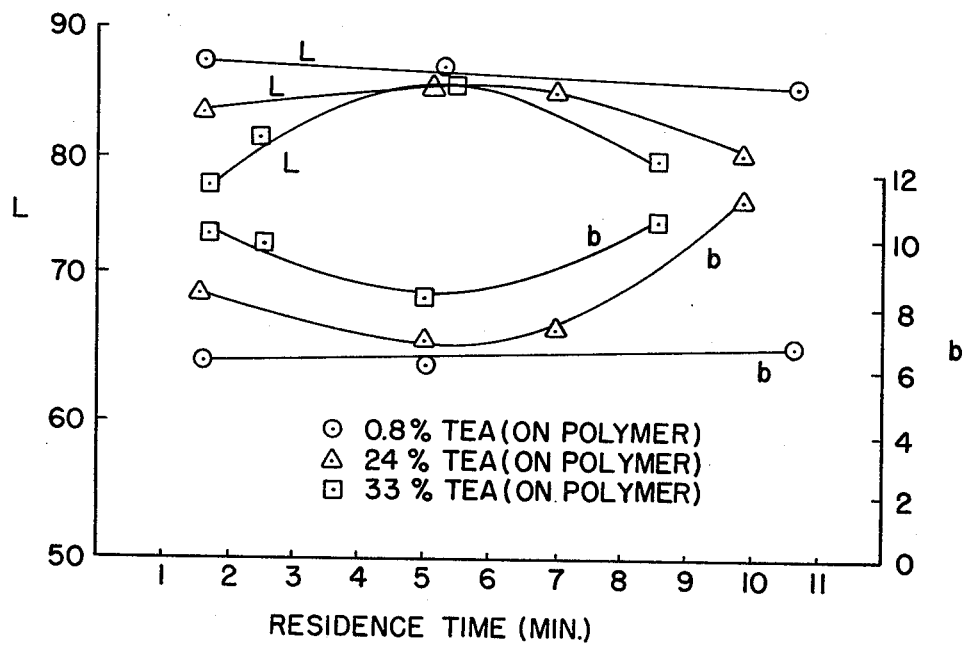
FIG. 6 is a graph indicating the effect of residence time on the color properties of the resins of the present invention.

While these results are indicative of the positive effect devolatilization and optimal mixing have on the thermal stability of acetal copolymer, thermal stability is not the only quality to be considered in producing such resins. For instance, color quality, measured by the lightness of the product (Hunter color "L" values), and the yellowness of the product (Hunter color "b" values) is also very important. To gain the best color quality copolymer maximum "L" values are sought while attempting to minimize "b" values. In order to determine optimum hydrolysis conditions for yielding good color-quality copolymer melt hydrolysis runs were made using the single vent devolatilization zone. The results, which are shown in FIG. 6, point to a definitive hydrolysis residence time when the weight percent of triethylamine is 24% and 36%, whereas at low weight percent of TEA, the residence time is not critical. Based on FIG. 6, the ideal hydrolysis residence time to achieve the best color quality is about 5 minutes.

The scope of the present invention necessarily includes the use of various equipment and/or techniques at different stages of the process. For example, at present a preferred embodiment of this invention includes the use of a tripel-vented single screw extruder as a devolatilization zone. The first vent port is not supplied with a vacuum since the autogenous pressure developed in the copolymer by evolution of side products during hydrolysis is greater than atmospheric pressure and sufficient to expunge volatile side products at the point immediately after the hydrolysis zone. Subsequent vent ports, however, are connected to a vacuum source in order to insure further removal of unwanted side products.

A series of experiments using a copolymer feedstock characterized by the physical properties shown in TABLE 1 were made to determine the optimum combination of process feature utilizing this particular embodiment.

TABLE 1

| FEEDSTOCK PROPERTIES | |
| --- | --- |
| $K_D$ (%/min.) | 0.035 |
| Melt Index | 9.2 |
| Weight % Ethylene Oxide | 2.65 |
| Ethylene Oxide Distribution | 81% mono-, 19% di-, and 0% tri-oxyethylene units |
| Hunter Color: | |
| "L" | 85.8 |
| "a" | −0.8 |
| "b" | 6.0 |

The results of these experiments are reported in Table II.

TABLE II

| No. | No. of Koch Mixing elements | Base/Polymer Ratio, (%) | TEA Conc. in Base, (wt. %) | Resd. Time (min.) | Hydrolysis Temp., (°C.) | $K_d$, (%/min) | MI | "L" | "a" | "b" |
| --- | --- | --- | --- | --- | --- | --- | --- | --- | --- | --- |
| 1 | 4 | 9 | 5.0 | 2.4 | 180 | .057 | 22.4 | 87.0 | −1.1 | 7.3 |
| 2 | 4 | 32 | 5.0 | 1.6 | 180 | .025 | 14.8 | 88.7 | −1.3 | 6.2 |
| 3 | 4 | 10 | 20.0 | 1.5 | 180 | .044 | 19.0 | 91.3 | −1.0 | 4.7 |
| 4 | 4 | 26 | 20.0 | 2.4 | 180 | .026 | 14.6 | 85.5 | −1.5 | 12.2 |
| 5 | 4 | 20 | 12.5 | 2.0 | 200 | .041 | 19.0 | 87.7 | −1.0 | 5.8 |
| 6 | 4 | 10 | 5.0 | 1.6 | 220 | .051 | 21.2 | 90.3 | −1.0 | 5.2 |
| 7 | 4 | 29 | 5.0 | 2.4 | 220 | .046 | 29.6 | 88.9 | −1.0 | 6.4 |
| 8 | 4 | 10 | 20.0 | 2.4 | 220 | .046 | 20.8 | 91.0 | −1.0 | 4.8 |
| 9 | 4 | 29 | 20.0 | 1.5 | 220 | .032 | 16.9 | 90.4 | −1.0 | 5.5 |
| 10 | 8 | 20 | 12.5 | 2.0 | 170 | .016 | 10.2 | 84.2 | −0.8 | 10.8 |
| 11 | 8 | 20 | 1.0 | 2.0 | 200 | .021 | 11.3 | 88.9 | −1.1 | 7.1 |
| 12 | 8 | 5 | 12.5 | 2.0 | 200 | .019 | 12.7 | 87.4 | −0.9 | 8.4 |
| 13 | 8 | 20 | 12.5 | 1.2 | 200 | .017 | 11.3 | 89.5 | −1.2 | 6.8 |
| 14 | 8 | 20 | 12.5 | 2.0 | 200 | .023 | 11.2 | 89.4 | −1.2 | 8.0 |
| 15 | 8 | 20 | 12.5 | 2.0 | 200 | .019 | 12.5 | 82.4 | 0.3 | 11.2 |
| 16 | 8 | 20 | 12.5 | 2.8 | 200 | .019 | 12.8 | 89.4 | −1.2 | 5.1 |
| 17 | 8 | 36 | 12.5 | 2.0 | 200 | .022 | 11.5 | 88.2 | −1.2 | 6.8 |
| 18 | 8 | 20 | 24.0 | 2.0 | 200 | .015 | 10.6 | 86.5 | −0.6 | 8.4 |
| 19 | 8 | 20 | 12.5 | 2.0 | 230 | .016 | 12.3 | 86.3 | −0.6 | 10.1 |
| 20 | 12 | 10 | 5.0 | 1.5 | 180 | .024 | 14.5 | 86.3 | −0.4 | 8.0 |
| 21 | 12 | 30 | 5.0 | 2.5 | 180 | .020 | 12.8 | 86.8 | −0.1 | 5.5 |
| 22 | 12 | 10 | 20.0 | 2.5 | 180 | .021 | 12.4 | 85.0 | −0.1 | 3.6 |
| 23 | 12 | 29 | 20.0 | 1.5 | 180 | .017 | 11.3 | 87.4 | −0.2 | 5.8 |
| 24 | 12 | 20 | 12.5 | 2.0 | 200 | .022 | 11.6 | 88.9 | −0.8 | 5.6 |
| 25 | 12 | 11 | 5.0 | 2.6 | 220 | .020 | 14.3 | 85.3 | −0.2 | 10.4 |
| 26 | 12 | 30 | 5.0 | 1.5 | 220 | .022 | 12.2 | 78.9 | −0.5 | 14.1 |
| 27 | 12 | 10 | 20.0 | 1.5 | 220 | .019 | 11.5 | 87.3 | −0.1 | 5.9 |
| 28 | 12 | 30 | 20.0 | 2.5 | 220 | .018 | 11.4 | 87.6 | −0.7 | 7.6 |

The results generally indicate that as compared to the properties of the feedstock there are significant improvements in at least one characteristic of each sample, and in most samples an improvement is shown in three very important characteristics, i.e., $K_D$, "L" value, and Hunter "a" value, a color characteristic indicating redness or greenness which is similar to the Hunter "b" value in that a low value is more desirable than a high value. It is suggested that a key factor in producing a copolymer with improved color quality is the reduced time to complete the hydrolysis which, in turn, is a direct result of being able to use an increased amount of hydrolysis reactant, the thorough mixing achieved by use of static mixers, and the rapid and efficient removal of unwanted side reactants by use of the novel devolatilization zone disclosed herein.

While there has been described what is believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. A process for stabilizing acetal copolymers which comprises:
    forming a melt of unhydrolyzed acetal copolymer in a single screw extruder;
    reacting said melt with a reactant comprising water and a compound which produces a hydroxide in the presence of water, in a reaction zone provided with a means for mixing said copolymer and said reactant according to the principle of flow division and rearrangement and maintaining at a temperature of from about 160° C. to about 240° C., and at a pressure of from about 150 to about 10,000 psia, for a time of from about 30 seconds to about 15 minutes; and
    devolatilizing said reacted copolymer immediately upon exiting from said reaction zone to remove undesirable volatile side products from said copolymer.

2. The process of claim 1 wherein said acetal copolymer is a normally-solid thylene copolymer having a melting point above about 150° C., the molecules of said copolymer containing from 60 to 99.6 mol percent of comparatively unstable monomeric oxymethylene units interspersed with comparatively stable monomeric—OR—units wherein R is a divalent radical containing at least two carbon atoms directly linked to each other and positioned in the polymer chain between the two valences, with any substituents on said R radical being inert, at least part of the terminal portions of said molecules comprising said unstable monomeric units.

3. The process of claim 1 wherein said compound is triethylamine.

4. The process of claim 1 wherein said compound is present in said reactant in an amount of from about 0.5% to about 85.0% by weight of compound based on the total weight of said reactant.

5. The process of claim 1 wherein the total amount of said reactant in said reaction zone is from about 5% to about 40% by weight of reactant to weight of polymer.

6. The process of claim 1 wherein said means for mixing is a static mixer.

7. The process of claim 6 wherein said static mixer comprises an elongated tubular jacket in which there is secured a series of mixing elements joined together.

8. The process of claim 7 wherein the number of mixing elements is from about 2 to about 15.

9. The process of claim 1 wherein said devolatilization is conducted in a devolatilization chamber comprising a vented screw extruder.

10. The process of claim 9 wherein said vented extruder has at least three vent ports positioned sequentially downstream of one another the first of said ports being opened to the atmosphere while the subsequent ports are connected to a vacuum so that the removal of undesirable side products is maximized thereby.

11. A process for stabilizing acetal copolymers which comprises:
    forming a melt of unhydrolyzed acetal copolymer in a melting zone;
    mixing, by the principle of flow division and rearrangement, said copolymer in a reaction zone with a reactant comprising water and a compound which produces a hydroxide in the presence of water and reacting said copolymer and said reactant at a temperature of about 160° C. to about 240° C. at a pressure of from about 150 psia to about 10,000 psia, for a time of from about 30 seconds to about 15 minutes; and
    devolatilizing said reacted copolymer immediately upon exiting from said reaction zone to remove undesirable volatile side products from said copolymer.

* * * * *